UNITED STATES PATENT OFFICE 2,389,079

LINOLEUM COMPOSITIONS

Paul O. Powers, Manheim Township, Lancaster County, Pa., assignor to Armstrong Cork Company, Lancaster, Pa., a corporation of Pennsylvania No Drawing. Application November 16, 1943,
Serial No. 510,493

9 Claims. (Cl. 260—21)

This invention or discovery relates to linoleum compositions and, more particularly, to linoleum cements; and it comprises a linoleum composition which includes a small amount of an aminotriazine-aldehyde condensation product; all as more fully hereinafter set forth and as claimed.

This application is a continuation-in-part of my copending application, Serial No. 417,523, filed November 1, 1941.

The cements or binders used in making linoleum are well-known and contain a characteristic substance prepared by thickening or bodying a drying oil or a semi-drying oil, hereinafter referred to as a siccative oil, by polymerization induced by heat, by an oxidation process or both by heat and oxidation. There are various well-known ways of preparing the polymerized oil used in the manufacture of linoleum. Polymerization of the siccative oil can be obtained by simply heating the oil to a high temperature in the order of 500° F. for a number of hours, generally 12 hours or longer. The resulting cement is known as "Taylor oil cement." The preparation of "Taylor oil" is described in British Patent No. 2,057 of 1871. Polymerization can also be obtained by exposing the oil to air to effect both polymerization and oxidation. When the oxidation and polymerization are effected by trickling the oil over hanging sheets of scrim cloth, the product is known as "scrim or shed oil." Such a process is disclosed in British Patents 209/1860 and 1,037/1863 to Frederick Walton, the inventor of linoleum. When the oil is prepared by blowing air through a quantity of oil in an oxidizer, the product is known as "mechanical oil." A process of this sort is disclosed in British Patent No. 7,742 of 1893, Wood-Bedford and is sometimes referred to as the Wood-Bedford process. In all of these processes, a semi-solid plastic mass or siccative oil gel results.

Taylor oil cement is often used in the condition it comes from the kettle without the addition of resin. With scrim or shed oil and with mechanical oil, common practice is to incorporate a resin with the polymerized siccative oil gel. In one method, the resin is charged with the oil into the mechanical oxidizer and the polymerization and oxidation is effected in the presence of the resin. This results in a siccative oil-resin gel cement as discharged from the oxidizer.

Where scrim or shed oil is used or when mechanical oil is employed, common practice is to add the resin to the siccative oil gel by the use of a heated mixer to form a siccative oil-resin gel.

Where a resin is used as part of the cement, it may be any naturally occurring resin, fossil resin, or synthetic resin, or a combination of such resins. Rosin, ester gum, kauri gum, copal, alkyd resin, rosin modified phenol-aldehyde resin, phenol-aldehyde resin, and the like, or mixtures thereof may be used. Rosin is at present the most widely used resin, and I prefer to incorporate rosin with the siccative oil in the oxidizer. All such resin-containing linoleum cements, regardless of when or how the resin is incorporated, are properly termed "siccative oil-resin gel" and are also included in the more generic term "siccative oil gel."

Ordinarily, linoleum cements comprise 65 to 85% by weight of siccative oil and about 15 to 35% by weight of resin. The drying oil most commonly employed is linseed oil, and other oils such as soya-bean oil, menhaden oil, perilla oil, rapeseed oil, China-wood oil, and the like, or mixtures thereof, may be used. The product known in the art as linoleum composition is prepared by admixing the linoleum cement with suitable fillers such as cork, wood flour, mineral fillers, pigments, and the like, and thereafter forming the mix into a sheet. Normally, the mix is applied to a backing, such as burlap, saturated felt, cotton fabric, or the like, and is consolidated thereon by calendering or by heated platen presses. In some instances, the backing is omitted.

In all cases, it is necessary that the product after consolidation undergo a further heating process to render it sufficiently hard and resistant to be commercially serviceable. This process must be carried out after mixing and consolidation has been effected and is usually accomplished by hanging the linoleum composition in a heated stove or oven. Maturing may be accomplished at about 175° F. and about 30 days for ¼ inch thicknesses. This is an expensive operation involving a large investment in stoves and as mentioned above, requires considerable time.

As hereinafter used, the term "linoleum composition" shall include both the matured and non-matured admixtures of linoleum cement and filler ingredients.

Various ingredients have been added to linoleum compositions for the purpose of accelerating the maturing of the linoleum mix. Among the materials which have proved to be fairly efficient accelerators for linoleum compositions have been certain condensation products of formaldehyde with certain phenols and cresols which when added in small amounts to the linoleum compositions result in a reduction in the time required to mature the linoleum mix. However, the condensation products heretofore used as accelerators in linoleum compositions possess the decided disadvantage of decomposing at the maturing temperatures employed resulting in the formation of highly volatile compounds which are liberated and, therefore, their presence in the stoves and in the mix is a definite health hazard. Further, because of this tendency to decompose, these condensation products sometimes show no appreciable effect upon the maturing of the mix at the temperatures at which the linoleum is matured, that is, temperatures of about 160° F. to about 180° F., because the phenols and cresols liberated are recognized antioxidants and their presence in the stoves prevents to some degree the maturing of the siccative oils in the mix. Another disadvantage resulting from the employment of these particular condensation products is that they tend to discolor the final product.

I have found that a linoleum composition may be prepared containing a small amount of aminotriazine-aldehyde condensation products. Cements containing these compounds when employed in a linoleum mix cause a great reduction in the time required to mature the mix. The aminotriazine-aldehyde condensation products are not volatile at the temperatures employed in maturing the mix and, therefore, there is no possibility of dangerous fumes and gases. Furthermore, these particular compounds greatly accelerate the maturing of the lincleum mix at the temperatures commonly used in the maturing operation. Still another advantage resulting from the use of the particular cements of my invention is that, with their use, there is no tendency of the final product to become discolored.

The compositions suitable for use in the preparation of the cements of my invention are not limited to any single aminotriazine-aldehyde condensation product and any material of this class may be employed if desired. However, the condensation product of melamine and its derivatives such as 2,4,6-triethyl and triphenyl triamino 1,3,5-triazines, 2,4,6-trihydrazino 1,3,5-triazine and the corresponding condensed triazines, such as melam and melem appear to be the most readily available commercial substances and, in addition to the availability of these particular compounds, it appears that particularly excellent linoleum compositions are obtained when these particular compounds are employed as accelerators. In addition to the particular triazines set forth above, triazines containing one or two reactive amino groups such as ammeline, ammelide, formoguanamine, 2-amino 1,3,5-triazine and their substitution products as well as nuclear substituted aminotriazines such as 2-chloro 4,6-diamino- 1,3,5-triazine, 2-phenyl 4-amino 6-hydroxy 1,3,5-triazine, 6-methyl-2,4-diamino 1,3,5-triazine and the like may be condensed with lower or higher aliphatic, aromatic or heterocyclic aldehydes to produce accelerators which are capable of use in the cements of my invention.

Many of the above mentioned aminotriazines, including melamine, substituted melamine and melamine derivatives, may be condensed with any suitable aldehyde of the aliphatic, aromatic or heterocyclic series such as formaldehyde, acetaldehyde, propionaldehyde, butyraldehyde, hexaldehyde, heptaldehyde, crotonaldehyde, allylaldehyde, benzaldehyde, cinnamylaldehyde, furfural and the like to produce a condensation product which may be incorporated with any of the linoleum cements now commonly used in the art and result in a cement which tends to cure much quicker than any of the cements heretofore known.

The aldehydes themselves may be used as well as compounds yielding aldehyde, for example, paraformaldehyde, hexamethylenetetramine, trioxymethylene, paraldehyde, and the like.

The aminotriazine - aldehyde condensation products may be prepared by any method known to the art, for example, that method disclosed in United States Patent 2,197,357 to Widmer et al. The condensation should be so controlled, however, that the final products are in a low stage of condensation and are reactive. Such condensation products are water-dispersible or water-soluble and may be readily mixed into a linoleum composition. Water-dispersible or water-soluble aminotriazine-aldehyde condensation products are particularly advantageous additives to linoleum cements or compositions according to my invention as distinguished from those aminotriazine-aldehyde condensation products which are soluble in organic solvents. The term "water-dispersible condensation product" comprehends not only those compounds which form a true solution but also those which, upon admixture with water, form a dispersion in water as distinguished from those products which are soluble in organic solvents.

My invention only contemplates the aminotriazine-aldehyde condensation products and does not contemplate the amino compounds or their additive products for I have found that compounds like cyanamide and dicyandiamide cause excessive yellowing of the linoleum compositions which is highly undesirable. By the term "condensation product of an aldehyde and an aminotriazine" is meant a reaction product of these compounds wherein there is split off a small molecule, such as water.

In practicing my invention, a small amount of a reactive, water-dispersible, aminotriazine-aldehyde condensation product or a mixture of such condensation products may be added to the linoleum cements known in the art. The compositions thus prepared may then be mixed with any of the well-known filling materials such as cork, wood flour and the like, pigments and other materials regularly employed in the manufacture of linoleum. The triazine-aldehyde condensation may be first added to the siccative oil gel followed by the addition of the usual pigments and fillers, or a mix of siccative oil gel, pigments and fillers may be first formed and then the aminotriazine-aldehyde condensation product may be added. The order of mixing is not critical as long as the drying oil has undergone the original processing stage that is a treatment according to the scrim process or similar processes well known to the art. Linoleum mixes containing the cement of my invention are matured at a greater saving of time than are the linoleum mixes which contain the cements of the prior art. Although the cements of my invention are by no means limited to the proportion of accelerator added, it is advantageous that the accelerator be present in relatively small amounts. I have found it particularly advantageous to employ the aminotriazine-aldehyde condensation products in amounts equal to about 1% to about 10% of the weight of the siccative oil gel. Should less than 1% of the accelerator be employed in the cement, no substantial acceleration in maturing is obtained. The use of more than 10% of condensation products is somewhat disadvantageous in that, with more than 10% of the condensation products present, there is a tendency for the cement to harden too rapidly, resulting in a final product which may be too hard and brittle to be satisfactorily used as a somewhat flexible floor covering which normally is handled in rolls. When the floor covering is formed into tiles or relatively small squares which are not rolled, the condensation products may be increased to about 15% of the weight of the gel.

The following examples in which all proportions given are by weight, illustrate various specific embodiments of my invention. These examples are given merely by way of illustration and not by limitation.

*Example 1.*—126 grams of melamine were suspended in 244 grams of 37% formaldehyde solution to which sufficient sodium hydroxide had been added to maintain the pH at 8.0 to 10.0. The mixture was heated to reflux temperatures and refluxed for ten minutes. Most of the water remaining in the reaction mixture was then evaporated off at atmospheric pressure. Fifteen grams of the resinous product obtained were added to 300 grams of a siccative oil-resin gel comprising 75% linseed oil and 25% rosin in an internal mixer and the mixture was agitated until homogeneous. A linoleum mix containing the cement thus prepared matured in 9½ days.

*Example 2.*—126 grams of melamine were suspended in 244 grams of 37% formaldehyde solution to which sufficient sodium hydroxide had been added to maintain the pH at 8.0 to 10.0. The mixture was heated to reflux temperatures and refluxed for ten minutes. Most of the water remaining in the reaction mixture was then evaporated off at atmospheric pressure. Thirty grams of the resinous product obtained were added to 300 grams of a siccative oil-resin gel comprising 75% linseed oil and 25% rosin in an internal mixer and the mixture thus formed was agitated until homogeneous. A linoleum mix containing the cement thus prepared matured in 6½ days.

*Example 3.*—126 grams of melamine were suspended in 405 grams of 37% formaldehyde solution to which sufficient sodium hydroxide had been added to maintain the pH at 8.0 to 10.0. The mixture was heated to reflux temperatures and refluxed for ten minutes. Most of the water remaining in the reaction mixture was then evaporated off at atmospheric pressure. Thirty grams of the resinous product obtained were added to 300 grams of a siccative oil-resin gel comprising 75% linseed oil and 25% rosin in an internal mixer and the mixture thus formed was agitated until homogeneous. A linoleum mix containing the cement thus prepared matured in eight days.

*Example 4.*—A linoleum mix containing a cement comprising 75% partially processed linseed oil and 25% rosin was matured under conditions similar to that employed in Examples 1, 2, and 3. The mix was identical in all respects to those employed in Examples 1, 2, and 3 with the exception that the condensation products of melamine and formaldehyde were not present. The mix matured in 24 days.

It should be noted that the proportions and ingredients set forth in the above examples may be varied without departing from the scope of the invention. However, I have found that particularly advantageous results are obtained when melamine-aldehyde condensation products are employed as accelerators in the cements of my invention in the proportion of from 1% to about 10% of the weight of siccative oil gel. When these particular ratios of this particular compound are used, a rapid maturing, stable linoleum cement is obtained. In addition, the melamine-aldehyde resins are very readily added to the linoleum mix. They may be incorporated therein either in water solution or in solid form without the necessity for employing comparatively volatile solvents such as butanol, toluene and the like. The use of these solvents would be particularly disadvantageous in a linoleum mix because of the danger associated with their volatility and inflammability.

The use of the cements of my invention in a linoleum mix greatly reduces the time necessary to completely mature the linoleum mix and thereby results in valuable savings in time and materials in the linoleum making process.

The linoleum compositions of my invention yield final products which are characterized by excellent wear resistance, flexibility, and resiliency. They may be utilized in coverings for floors, walls, desk tops, and the like. In addition, linoleum compositions containing aminotriazine-aldehyde condensation products may be matured to form a final product which exhibits uniform hardness throughout; whereas the linoleum compositions heretofore known upon completion of the maturing stage still exhibit a marked degree of softness at the inner portions of the product. Such a defect is known to the art as a "soft center."

While the invention has been disclosed in terms of specific examples employing certain materials in definitely stated proportions, the description is intended to be merely illustrative. It is obvious that various modifications may be made without departing from the spirit of the invention and it is to be understood that the invention is limited only by the appended claims.

I claim:

1. A linoleum composition which includes a linoleum cement containing a siccative oil gel and about 1% to about 15% by weight of a maturing accelerator for said cement, said accelerator comprising a reactive condensation product of reactants consisting of an aldehyde and an aminotriazine containing a primary amino group.

2. A linoleum composition in accordance with claim 1 in which the aldehyde is formaldehyde.

3. A linoleum composition which includes a linoleum cement containing a siccative oil gel and about 1% to about 15% by weight of a maturing accelerator for said cement, said accelerator comprising a reactive condensation product of reactants consisting of an aldehyde and melamine, said condensation product being characterized by solubility in water.

4. A linoleum composition in accordance with claim 3 in which the aldehyde is formaldehyde.

5. A linoleum composition which includes a linoleum cement containing a siccative oil gel and about 1% to about 10% by weight of a maturing accelerator for said cement, said accelerator comprising a reactive condensation product of reactants consisting of an aldehyde and an aminotriazine containing a primary amino group.

6. A linoleum composition which includes a linoleum cement containing a siccative oil gel and about 1% to about 10% by weight of a maturing accelerator for said cement, said accelerator comprising a reactive condensation product of reactants consisting of an aldehyde and melamine, said condensation product being characterized by solubility in water.

7. A linoleum composition which includes a linoleum cement containing 65% to 85% by weight of siccative oil and 35% to 15% by weight of resin, to form a siccative oil-resin gel, and, in addition, about 1% to about 10% of the weight of said siccative oil-resin gel of a maturing accelerator for said cement, said accelerator comprising a reactive condensation product of reactants consisting of an aldehyde and an aminotriazine containing a primary amino group.

8. A linoleum composition in accordance with claim 1 in which the aminotriazine is a substituted aminotriazine.

9. A linoleum composition in accordance with claim 5 in which the aminotriazine is a substituted aminotriazine.

PAUL O. POWERS.